United States Patent [19]

Takano

[11] Patent Number: 4,811,134
[45] Date of Patent: Mar. 7, 1989

[54] UNITARY DIE CAST HEAD DRUM BASE FOR A MAGNETIC RECORDING AND/OR REPRODUCING APPARATUS

[75] Inventor: Takashi Takano, Yokohama, Japan

[73] Assignee: Victor Company of Japan, Limited, Japan

[21] Appl. No.: 204,955

[22] Filed: May 31, 1988

Related U.S. Application Data

[63] Continuation of Ser. No. 902,116, Aug. 29, 1986, abandoned, which is a continuation of Ser. No. 500,926, Jun. 3, 1983, abandoned.

[30] Foreign Application Priority Data

Jun. 4, 1982 [JP] Japan .................. 57-83274[U]

[51] Int. Cl.[4] .................. G11B 5/27; G11B 5/8; G11B 15/00; G11B 17/00
[52] U.S. Cl. .................. 360/85; 360/95; 360/104
[58] Field of Search .................. 360/95, 84, 85, 104, 360/87, 75, 105, 106, 107, 137; 242/198

[56] References Cited

U.S. PATENT DOCUMENTS

| | | | |
|---|---|---|---|
| 3,800,314 | 3/1974 | Sato | 360/95 |
| 3,899,795 | 8/1975 | Watanabe | 360/137 X |
| 3,979,772 | 9/1976 | Umeda | 242/198 |
| 4,060,840 | 11/1977 | Umeda | 360/85 |
| 4,126,888 | 11/1978 | Hayashi et al. | 360/85 |
| 4,138,699 | 2/1979 | Ura et al. | 360/85 |
| 4,258,399 | 3/1981 | Iijima et al. | 360/95 |
| 4,408,236 | 10/1983 | Murata et al. | 360/95 |
| 4,445,159 | 4/1984 | Nemofo et al. | 360/85 |
| 4,517,614 | 5/1985 | Straub et al. | 360/95 |

FOREIGN PATENT DOCUMENTS

| | | | |
|---|---|---|---|
| 0074148 | 3/1983 | European Pat. Off. | 360/85 |
| 55-67901 | 5/1980 | Japan | 360/137 |
| 57-46349 | 3/1982 | Japan | 360/85 |
| 57-130256 | 8/1982 | Japan | 360/137 |
| 57-164468 | 10/1982 | Japan . | |
| 57-186259 | 11/1982 | Japan . | |
| 58-205945 | 12/1983 | Japan | 360/137 |
| 59-124062 | 7/1984 | Japan | 360/85 |
| 1198007 | 7/1970 | United Kingdom . | |
| 2071899 | 9/1981 | United Kingdom | 360/85 |

Primary Examiner—Stuart N. Hecker
Assistant Examiner—Alfonso Garcia
Attorney, Agent, or Firm—Lowe, Price, LeBlanc, Becker & Shur

[57] ABSTRACT

A magnetic tape recording and reproducing apparatus such as a VTR apparatus has a chassis, a head drum, and a pair of tape loading members movable on the chassis for keeping a magnetic tape in contact with a peripheral surface of the head drum along a tape path extending over an angular interval. A head drum base for use in the magnetic tape recording and reproducing apparatus comprises a head drum mount adapted to be fastened to the chassis for mounting the head drum thereon, and a pair of stops integrally formed with the head drum mount for positioning the tape loading members to maintain the magnetic tape in the tape path.

10 Claims, 2 Drawing Sheets

UNITARY DIE CAST HEAD DRUM BASE FOR A MAGNETIC RECORDING AND/OR REPRODUCING APPARATUS

This application is a continuation of application Ser. No. 902,116, filed Aug. 29, 1986, now abandoned, which is a continuation of application Ser. No. 500,926, filed June 3, 1983, now abandoned.

BACKGROUND OF THE INVENTION

The present invention relates to a head drum base for use in a magnetic tape recording and reproducing apparatus such as a VTR apparatus.

Magnetic tape recording and reproducing apparatus with an automatic tape loading capability generally include a head drum having recording and reproducing heads and a pair of tape loading poles movable along slots in a head drum base between a tape cassette loaded and the head drum. When the tape cassette is inserted into the magnetic recording and reproducing apparatus, the tape loading poles are moved from the tape cassette to positions one on each side of the head drum for drawing a magnetic tape out of the tape cassette and setting the magnetic tape in a prescribed tape path including a partly circular path around the periphery of the head drum. The partly circular tape path around the peripheral surface of the head drum is particularly required to be defined with increased accuracy for better signal recording and reproducing operation with good interchangeability between manufactured apparatus. Therefore, the tape loading poles should be positioned highly accurately with respect to the head drum while the magnetic tape recording and reproducing apparatus is in operation.

Conventional magnetic tape recording and reproducing apparatus have a chassis supporting thereon a head drum base on which a head drum is fixedly placed and a pair of stops for positioning the tape loading poles relative to the head drum. The drum base and the stops are separately fastened to the chassis by means of screws. It has been quite tedious and time-consuming to attach the stops to the chassis with a desired degree of accuracy relative to the head drum. The trend in the actual assembling process is that the stops mounted on the chassis are subjected to varying positional accuracies among many magnetic tape recording and reproducing apparatus.

SUMMARY OF THE INVENTION

It is an object of the present invention to provide a head drum base having means for stopping tape loading rollers highly accurately with respect to a head drum.

According to the present invention, there is provided a head drum base for use with a magnetic tape recording and reproducing apparatus having a chassis, a head drum, and a pair of tape loading members movable on the chassis for keeping a magnetic tape in contact with a peripheral surface of the head drum along a tape path extending over an angular interval, the head drum base comprising a head drum mount adapted to be fastened to the chassis for mounting the head drum thereon; and a pair of stops integrally formed with the head drum mount for positioning the tape loading members to maintain the magnetic tape in the tape path. The head drum base additionally includes a pair of bifurcated members integrally formed with the head drum mount and positioned adjacent to the stops, respectively, for guiding the tape loading members toward the stops.

BRIEF DESCRIPTION OF THE DRAWINGS

The present invention will be described in detail by way of illustrative example with reference to the accompanying drawings, in which.

DETAILED DESCRIPTION

Figure 1:
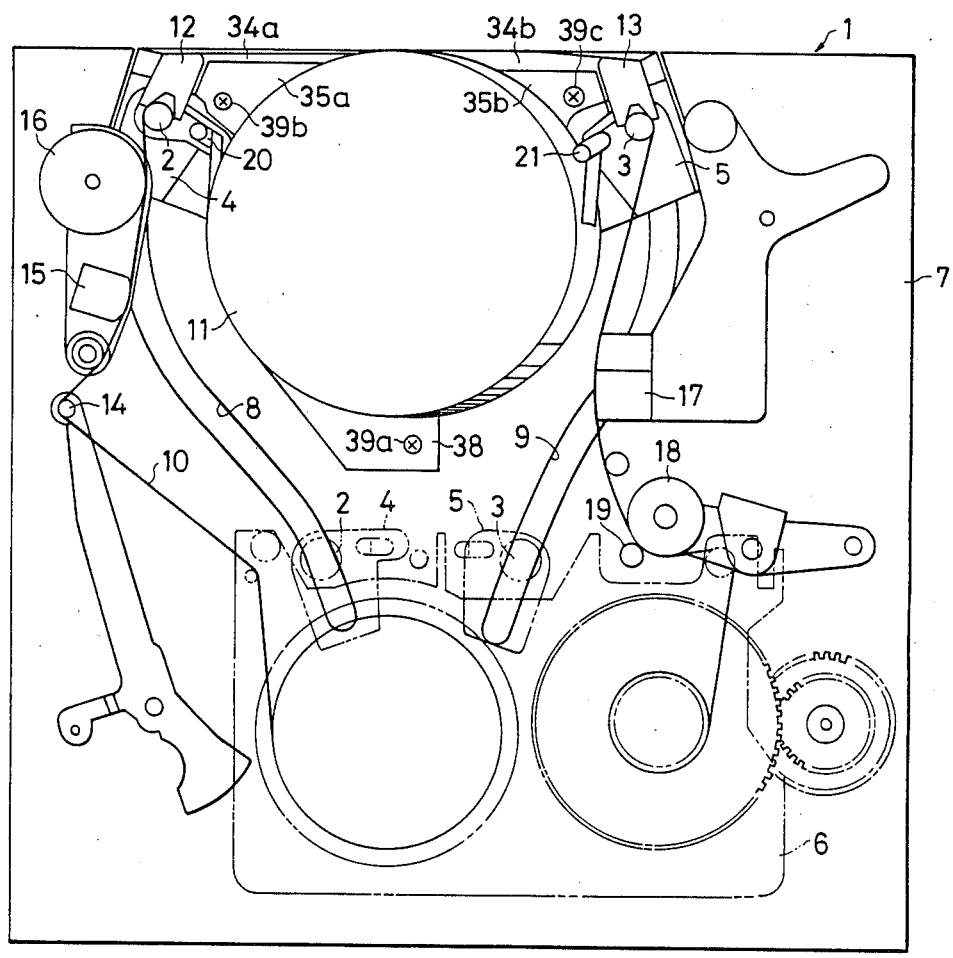
FIG. 1 is a plan view of a magnetic tape recording and reproducing apparatus with an automatic tape loading ability, the parts being shown as in a recording or playback mode.

FIG. 1 shows a magnetic tape recording and reproducing apparatus 1 having a mechanism for automatically loading a magnetic tape for recording and playback operations, the apparatus 1 incorporating therein a head drum base according to the present invention.

The magnetic tape recording and reproducing apparatus 1 includes a chassis 7 having a pair of curved slots 8, 9 defined therein and a pair of supports 4, 5 mounting a pair of tape loading rollers 2, 3, respectively, thereon and movable away from a small-size tape cassette 6 inserted in the apparatus 1 along the curved slots 8, 9, respectively, to enable the tape loading rollers 2, 3 to take a magnetic tape 10 out of the tape cassette 6. For automatically loading the magnetic tape 10 around a head drum 11, the supports 4, 5 are moved along the slots 8, 9 until they are finally engaged and positioned by a pair of stops 12, 13, respectively, located one on each side of the head drum 11. The magnetic tape 10 drawn out of the tape cassette 6 is held in contact with a tensioning pole 14, an erase head 15, an impedance roller 16, and an audio/control head 17, and is set in a partly circular tape path extending over an angular interval around the periphery of the head drum 11 which has video recording and reproducing heads (not shown). The magnetic tape 10 is driven to travel along by being gripped between a capstan 19 and a pinch roller 18. The supports 4, 5 also support a pair of inclined poles 20, 211 respectively thereon for guiding the magnetic tape 10 to contact the head drum 11 along the peripheral tape path therearound.

Figure 2:
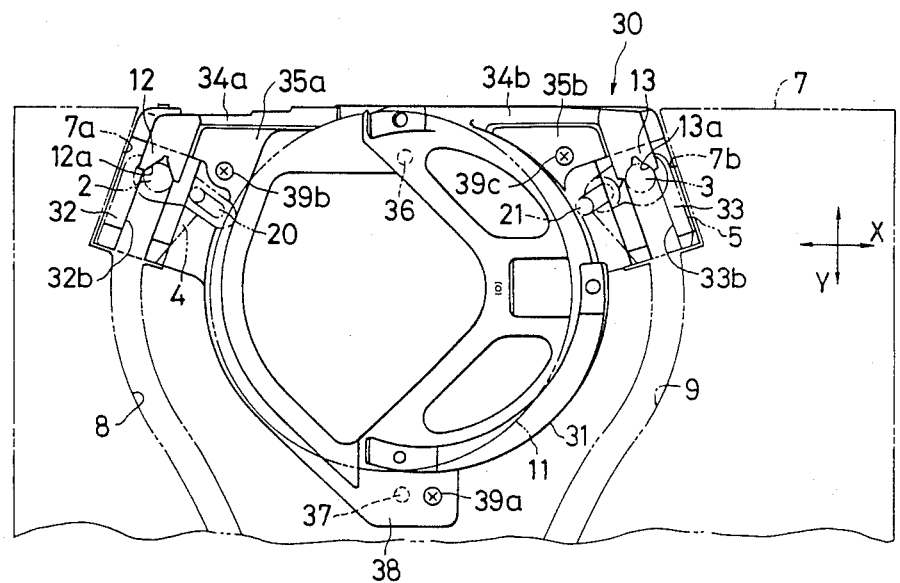
FIG. 2 is a fragmentary plan view of a head drum base incorporated in the magnetic tape recording and reproducing apparatus shown in FIG. 1.
Figure 3:
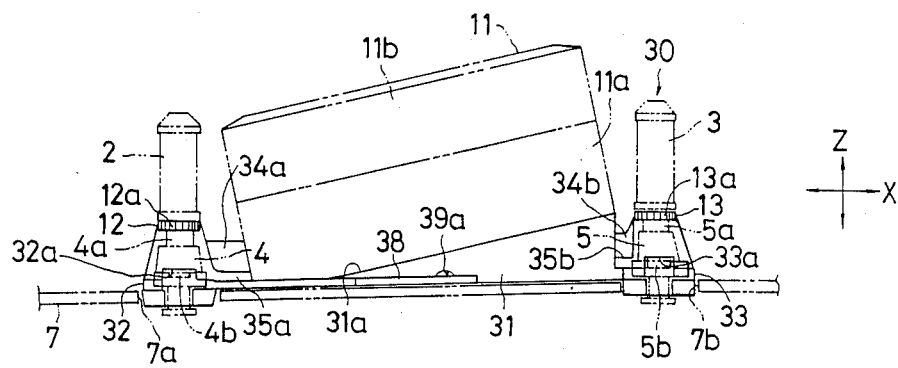
FIG. 3 is a front elevational view of the head drum base illustrated in FIG. 2.

FIGS. 2 and 3 illustrate a head drum base 30 according to the present invention. The head drum base 30 is made of aluminum by die casting and includes a head drum mount 31 having a slanted upper surface 31a with the head drum 11 mounted thereon, the stops 12, 13, and a pair of bifurcated members 32, 33 having grooves 32b, 33b, respectively, and positioned adjacent to the stops 12, 13. The head drum mount 31, the stops 12, 13, and the bifurcated members 32, 33 are integrally formed with each other. The stop 12 and the bifurcated member 32 are positioned on the lefthand side (as shown) of the head drum mount 31, and the stop 13 and the bifurcated member 33 are positioned on the righthand side (as shown) of the head drum mount 31. The stops 12, 13 and the bifurcated members 32, 33 are located with a desired positional accuracy relative to the head drum mount 31. The stops 12, 13 have a pair of notches 12a, 13a, respectively, for positioning the tape loading rollers 2, 3 with respect to the head drum 11 in a horizontal plane as defined by directions X and Y in FIG. 2. The bifurcated members 32, 33 have a pair of recesses 32a, 33a (FIG. 3), respectively, opening downwardly and disposed deeply at the ends of the grooves 32b, 33b, respectively. These recesses 32a, 33a serve to position the tape loading rollers 2, 3 with respect to the head drum 11 in a vertical direction Z. The stops 12, 13 and the bifurcated members 32, 33 are interconnected with sufficient mechanical strength by back ribs 34a, 34b and bottom plates 35a, 35b.

The head drum base 30 has a pair of positioning projections 36, 37 fitted respectively in corresponding holes defined in the chassis 7. The head drum mount 31 has a horizontal flange 38 extending toward the tape cassette 6 and fastened by a screw 39a to the chassis 7. The bottom plates 35a, 35b are also fastened to the chassis 7 by screws 39b, 39c, respectively. With the head drum base 30 thus fixed to the chassis 7, the bifurcated members 32, 33 are fitted in openings 7a, 7b, respectively, in the chassis 7. Since the head drum base 30 can be fixed in position only by the three screws 39a, 39b, 39c without the need for any positional adjustment, the head drum base 30 can be assembled on the chassis 7 with utmost ease. The stops 12, 13 are integral with the head drum mount 31 and hence have no mounting flanges directed away from the head drum mount 31. This allows the entire magnetic tape recording and reproducing apparatus 1 to be smaller in size.

The head drum 11 supported on the head drum mount 31 is composed of a lower fixed drum member 11a and an upper rotatable drum member 11b.

As shown in FIG. 3, the support 4 includes a roller support member 4a on which the tape loading roller 2 is rotatably mounted, and a downward projection 4b extending from the roller support member 4a. Likewise, the support 5 includes a roller support member 5a on which the tape loading roller 3 is rotatable mounted, and a downward projection 5b extending from the roller support member 5a.

In operation, the magnetic tape 10 is pulled out of the tape cassette 6 by the tape loading rollers 2, 3 moving along the curved slots 8, 9 away from the tape cassette 6 toward the stops 12, 13, respectively. The support 4 moves out of the slot 8 onto the bifurcated member 32. As the support 4 approaches the stop 12, the roller support member 4a is fitted into the notch 12a and the projection 4b is fitted into the recess 32a, so that the tape loading roller 2 can be positioned accurately with respect to the head drum 11. Similarly, when the support 5 reaches the stop 13, the roller support member 5a is fitted into the notch 13a and the projection 5b is fitted into the recess 33a, so that the tape loading roller 3 can be accurately positioned with respect to the head drum 11. The position of the stops 12, 13 with respect to the head drum 11 is not affected by the assembling process, but is determined by the head drum base 30 itself which is an aluminum die casting. With the tape loading rollers 2, 3 and hence the poles 20, 21 being thus positioned with accuracy, the partly circular tape path around the head drum 11 is accurately defined. Such tape paths remain dimensionally constant among a number of magnetic tape recording and reproducing apparatus manufactured. Accordingly, the interchangeability of tapes recorded or reproduced with respect such apparatus is well maintained.

Although a certain preferred embodiment of the present invention has been shown and described in detail, it should be understood that various changes and modifications may be made therein without departing from the scope of the appended claims.

What is claimed is:

1. A head drum base in the form of an integral die casting for use with a magnetic tape recording and reproducing apparatus having a chassis, a head drum, and a pair of tape loading members movable on the chassis for keeping a magnetic tape in contact with a peripheral surface of the head drum along a tape path, said head drum base comprising:
    (a) a head drum mount adapted to be mounted to the chassis and having an upper surface for mounting the head drum thereon, said supper surface being slanted relative to a lower surface of the head drum mount facing the chassis;
    (b) a pair of stops unitarily die cast formed with said head drum mount for positioning the tape loading members to maintain the magnetic tape in the tape path;
    (c) a pair of bifurcated members unitarily die cast formed with said head drum mount and said stops, said bifurcated members positioned adjacent to said stops, respectively, for guiding the tape loading members toward said stops, each of said bifurcated members having a groove leading to one of said stops; and
    (d) a pair of back ribs and a pair of bottom plates interconnecting said stops and said bifurcated members, respectively, wherein said head drum mount and said pair of stops and said pair of bifurcated members and said pair of back ribs and said pair of bottom plates are elements all die cast together so that the head drum base is of a one piece and unitary construction formed by said elements.

2. A head drum base according to claim 1, wherein each of said bifurcated members has a recess for receiving a portion of one of said tape loading members and positioning said one of said tape loading members in a direction substantially particular to a mounting surface of the chassis.

3. A head drum base according to claim 1, wherein each of said stops has a notch for receiving a portion of one of said tape loading members and positioning said one stop in a plane substantially parallel to a mounting surface of the chassis.

4. In a magnetic tape recording and reproducing apparatus having a chassis, a head drum, and a pair of tape loading members movable on the chassis for keeping a magnetic tape in contact with a peripheral surface of the head drum along a tape path, and a head drum base for mounting the head drum to the chassis, the improvement comprising said head drum base including:
    (a) a head drum mount connected to the chassis for mounting the head drum thereon; and
    (b) stop means unitarily die cast formed with the head drum mount for positioning the tape loading members to maintain the magnetic tape in the tape path.

5. The head drum base of claim 4, wherein said head drum base further includes a pair of bifurcated members die cast formed with said head drum mount, said stop means including a pair of stops die cast formed with said head drum mount for positioning the tape loading members to maintain the magnetic tape in the tape path, a pair of back ribs and a pair of bottom plates interconnecting said stops and said bifurcated members, respectively, a flange die cast formed with said head drum mount, said head drum mount and said pair of stops and said pair of bifurcated members and said pair of back ribs and said pair of bottom plates and said flange being elements all die cast together so that the head drum base is of a one piece and unitary construction formed by said elements, and screw means for securing the head drum base to the chassis, said screw means being insertable through the bottom plates and said flange so as to define the sole means for connecting the head drum base to the chassis.

6. A magnetic tape recording and reproducing apparatus comprising, in combination: a head drum base in the form of an integral die casting, a chassis, a head drum on the head drum base, and a pair of tape loading members movable on the chassis for keeping a magnetic tape in contact with a peripheral surface of the head drum along a tape path, said chassis having a pair of curved slots, said head drum base including:

(a) a head drum mount mounted to the chassis and having an upper surface for mounting the head drum thereon, said upper surface being slanted relative to a lower surface of the head drum mount facing the chassis;

(b) a pair of stops unitarily die cast formed with said head drum mount for positioning the tape loading members to maintain the magnetic tape in the tape path, said stops having notches defined respectively therein and each said notch having a substantially V shape in plan view;

(c) a pair of bifurcated members unitarily die cast formed with said head drum mount and said stops and positioned adjacent to said stops, respectively, for guiding the tape loading members toward said stops, each of said bifurcated members having a substantially straight groove extending from one of said curved slots to one of said stops; and (d) a pair of back ribs and a pair of bottom plates interconnecting said stops and said bifurcated members, respectively, wherein said head drum mount and said pair of stops and said pair of bifurcated members and said pair of back ribs and said pair of bottom plates are elements all die cast together so that the head drum base is of a one piece and unitary construction formed by said elements.

7. The apparatus of claim 6, wherein said back ribs and said bottom plates are positioned at a rear portion of the head drum base and wherein said bottom plates extend generally parallel to the chassis.

8. The apparatus of claim 6, wherein said V-shaped notches and substantially straight grooves are in respective alignment with each other in plan view.

9. The apparatus of claim 8, wherein said V-shaped notches and associated straight grooves are simultaneously machined tgether by virtue of said alignment.

10. The apparatus of claim 8, wherein said substantially straight grooves in said bifurcated members each have substantially parallel side walls extending outwardly from the stops in plan view.

* * * * *